United States Patent [19]

Huang et al.

[11] Patent Number: 5,365,583
[45] Date of Patent: Nov. 15, 1994

[54] METHOD FOR FAIL-SAFE OPERATION IN A SPEAKER PHONE SYSTEM

[75] Inventors: Shan-Shan Huang, Sunnyvale; Brian L. Hinman, Los Gatos; Eric K. Gaut, Palo Alto, all of Calif.

[73] Assignee: Polycom, Inc., San Jose, Calif.

[21] Appl. No.: 943,732

[22] Filed: Sep. 11, 1992

Related U.S. Application Data

[63] Continuation-in-part of Ser. No. 909,060, Jul. 2, 1992, abandoned.

[51] Int. Cl.$^5$ .................. H04M 9/08; H04M 1/20
[52] U.S. Cl. .................. 379/390; 379/389; 379/409
[58] Field of Search .............. 379/388, 389, 390, 406, 379/407, 408, 409, 410, 411

[56] References Cited

U.S. PATENT DOCUMENTS

| | | | |
|---|---|---|---|
| 4,282,411 | 8/1981 | Stewart | 379/406 |
| 4,578,543 | 3/1986 | LeBarlot | 379/410 |
| 4,591,670 | 5/1986 | Itoh | 370/32.1 |
| 4,600,815 | 7/1986 | Horna | 379/390 |
| 4,633,046 | 12/1986 | Kitayama | 370/32.1 |
| 4,724,540 | 2/1988 | Pace et al. | 379/389 |
| 4,741,025 | 4/1988 | Maruyama | 379/202 |
| 4,782,525 | 11/1988 | Sylvain et al. | 379/410 |
| 4,796,287 | 1/1989 | Reesor et al. | 379/390 |
| 4,845,746 | 7/1989 | Li | 379/411 |
| 4,903,247 | 2/1990 | Van Gerwen | 367/135 |
| 4,912,758 | 3/1990 | Arbel | 379/388 |
| 4,918,727 | 4/1990 | Rohrs | 379/410 |
| 4,965,822 | 10/1990 | Williams | 379/390 |
| 4,984,265 | 1/1991 | Connan et al. | 379/390 |
| 4,998,241 | 3/1991 | Brox | 370/32.1 |
| 5,054,061 | 10/1991 | Yoshida | 379/389 |
| 5,099,472 | 3/1992 | Townsend et al. | 370/390 |

OTHER PUBLICATIONS

W. David Pace, W. C. Wang, and Dennis L. Welty "A Low-Cost Voice-Switched Speakerphone IC" Telecommunications, Feb., 1985 pp. 70-74.

*Primary Examiner*—James L. Dwyer
*Assistant Examiner*—Scott L. Weaver
*Attorney, Agent, or Firm*—John S. Ferrell

[57] ABSTRACT

A method is disclosed for maintaining loop stability between a transmit and a receive path of a speaker phone which is capable of operating in either a full-duplex or a half-duplex mode. Loop stability is maintained and normal operation is achieved by controlling transmit and receive path attenuators. The method first determines whether feedforward or feedback signal levels should be used. Based on this determination, the signal and noise parameters along various points in the transmit and receive path are evaluated. Based on the parameter values, the transmit and receive attenuators are adjusted to maintain loop stability and to operate the speaker phone in the proper state. Additionally, when the speaker phone adjusts the transmit attenuator for greater signal attenuation in order to maintain loop stability the noise fill-in component of the speaker phone will generate additional background noise to maintain a constant background noise level, as perceived by the far-end user.

6 Claims, 3 Drawing Sheets

METHOD FOR FAIL-SAFE OPERATION IN A SPEAKER PHONE SYSTEM

CROSS-REFERENCE TO RELATED APPLICATIONS

This is a continuation-in-part of application Ser. No. 07/909,060, entitled "Method and Apparatus for Fail-Safe Operation in a Speaker Phone System", filed Jul. 2, 1992, by Shan-Shan Huang, Brian L. Hinman, and Eric K. Gaut, and abandoned.

The subject matter of this application is related to the subject matter of copending applications Ser. No. 07/896,855 abandoned, entitled "Method and Apparatus For Double-Talk Detector", filed Jun. 12, 1992, by Shan-Shan Huang, Brian L. Hinman and Eric K. Gaut, and Ser. No. 07/906,822 abandoned, entitled "Method and Apparatus for Ringer Detection", filed Jun. 30, 1992, by Brian L. Hinman, Shan-Shan Huang, and Eric K. Gaut, which are commonly assigned with the present invention and are incorporated by reference herein.

BACKGROUND OF THE INVENTION

1. Field of the Invention

This invention relates to telephone technology and more particularly to a fail-safe operation method for maintaining loop stability between the transmit and receive paths of a speaker phone and for switching from a full-duplex into a half-duplex mode when loop instability is detected.

2. Description of the Background Art

Traditional speaker phones function in a half-duplex mode, allowing only one person at a time to speak. When one talker (near-end) is speaking in a half-duplex system, the signals received from the other talker (far-end) are blocked until the near-end speech is either completed or interrupted by a stronger signal. Often, while a talker is speaking, the signals may be blocked if someone at the other end makes moderate noises and activates the microphone. In other cases, talkers are required to shout into the speaker phone in order to be heard by the other end. It is generally very difficult, if not impossible, in a half-duplex system to interrupt current talkers while they are speaking. All of these conditions are very annoying in a teleconferencing situation.

Room acoustic echo has always been one of the most severe problems in hands-free speaker phone systems. Acoustic echoes occur when the far-end speech sent over the telephone line comes out from the near-end loudspeaker, feeds back into a nearby microphone, and then travels back to the originating site. Talkers at the far-end location can hear their own voices coming back slightly after they have just spoken. One method of eliminating these irritating acoustic echoes is to apply an echo suppressor to switch off the microphone while the other end is talking. This results in the half-duplex operation currently implemented on standard speaker phones. More sophisticated acoustic echo cancelers are available for full-duplex operation to improve interactivity in teleconferencing. Acoustic echo cancelers employ adaptive filtering techniques to model the impulse response of the conference room in order to reproduce the echoes from the speaker signal. The estimated echoes are then subtracted from the out-going microphone signals to prevent these echoes from going back to the far-end.

SUMMARY OF THE INVENTION

In accordance with the present invention, a method is disclosed for maintaining loop stability between the transmit and receive paths of a speaker phone and for gradually switching from a full-duplex into a half-duplex mode when loop instability is detected. The fail-safe apparatus consists of controllable attenuators positioned in the transmit path and in the receive path to control loop gain by limiting signal flow along the path when instability is detected.

The fail-safe operation process calculates line echo canceler total echo return loss and acoustic echo canceler echo return loss enhancement values and determines the state of operation. In the preferred embodiment, there are 6 possible states of operation. Once the appropriate operating state is determined, certain operating parameters are evaluated using measured signal levels from differing circuit points depending on the performance of the echo cancelers. These operating parameters are then used to access a look-up table which places the speaker phone into a defined mode of operation, receive, transmit, fast idle, or slow idle, by programming the behavior of the two circuit attenuators. The fail-safe process updates the attenuators approximately once every millisecond.

DESCRIPTION OF THE PREFERRED EMBODIMENT

Figure 1A:
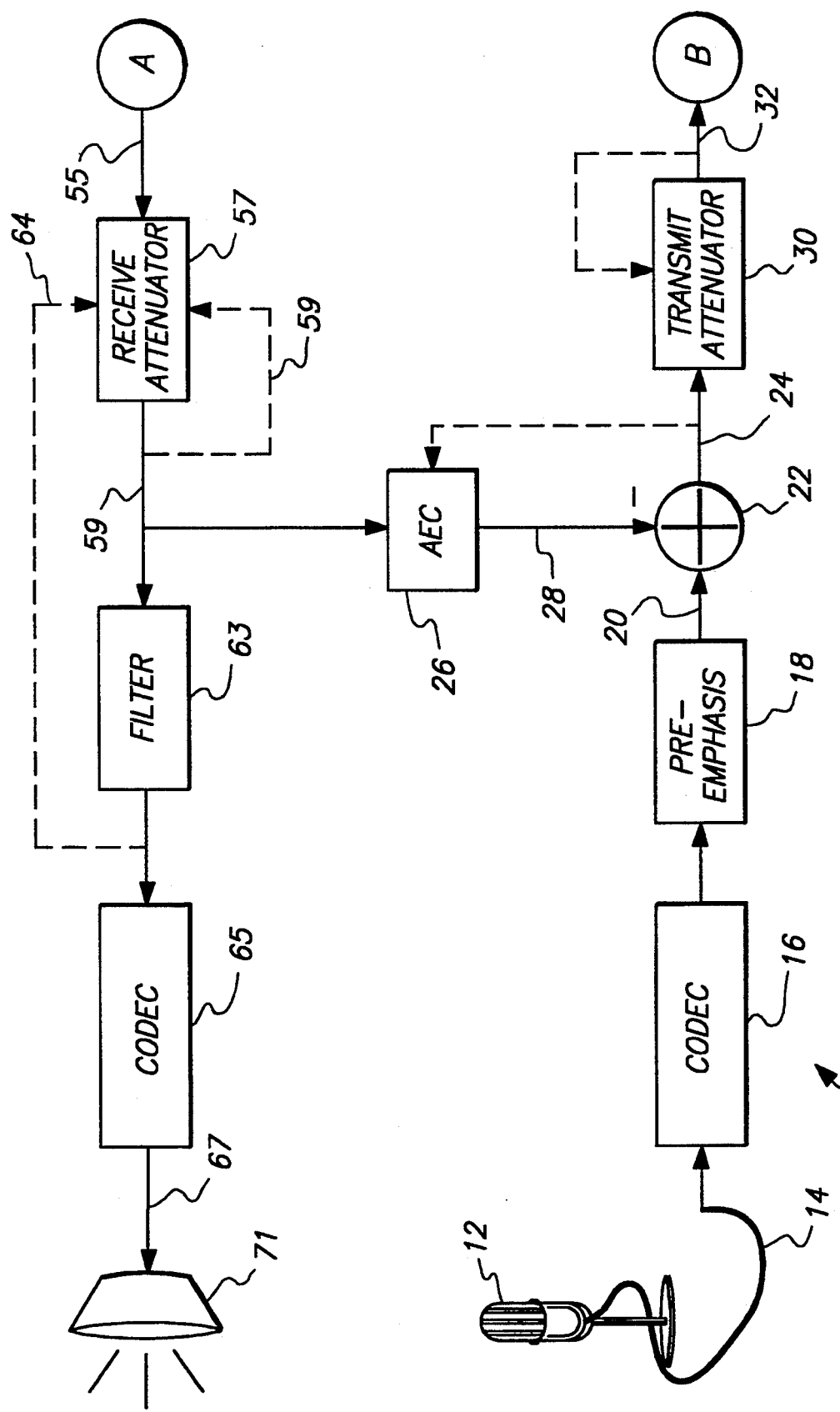
FIG. 1(a) and (b) are block diagrams illustrating major components of a speaker phone of the present invention.
Figure 1B:
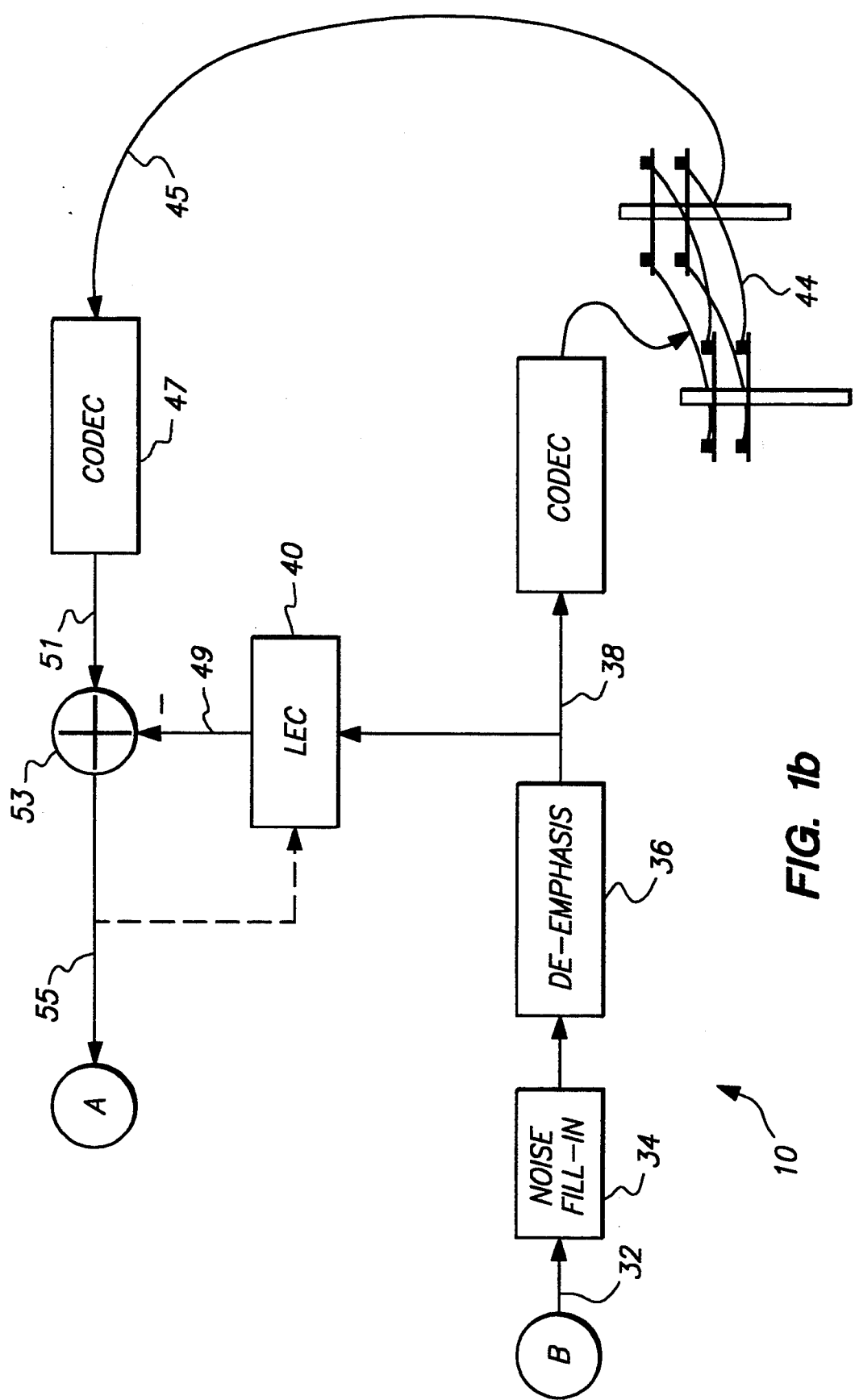

Referring now to FIG. 1(a) and (b), there is shown a speaker phone 10 comprising two originating signal paths, including speaker signal 45 and microphone signal 14. The functions shown in FIG. 1 (a) and (b) of speaker phone 10 are largely digitally implemented using conventional digital signal processing hardware. In the preferred embodiment, a DSP16A (commercially available from AT&T) digital signal processor is used in conjunction with conventional memory and hardware logic components. The speaker signal 45 comes from the far-end via telephone line 44, propagates to and through the near-end speaker 71, and is heard by listeners in the near-end. Speech originating from the near-end is detected by microphone 12 and transmitted to the far-end along telephone lines 44. The microphone signal 14 coming from the near-end can also include echo coming from the far-end via speaker 71. The primary purpose for digitally processing these speaker and microphone signals 45,14 is to remove the echoes in microphone signal 14 so that listeners in the far-end will only hear the near-end talkers, not their own voices coming back after the round-trip delay of telephone transmission. Signal processing also removes the echoes and side tones in speaker signal 45 so that only the far-end speech can be heard in the near-end.

Analog signals produced by talkers in the near-end are picked up by microphone 12, low-pass filtered and digitized at 8 kilohertz into 16-bit integers by codec 16. In the preferred embodiment, codec 16 may be implemented using a model 7525 codec commercially available from AT&T. The digitized signal is then processed through a high-pass pre-emphasis filter 18 of conventional design in order to boost the high-frequency components to improve the performance of the echo cancelers. Processed signal 20 is combined with Acoustic Echo Canceler (AEC) signal 28 in summer 22 to produce summer output 24. Acoustic Echo Canceler (AEC) 26 samples attenuator output 59 as its reference signal and provides a simulated echo signal which, when subtracted from processed signal 20 removes the speaker signal 45 component from the processed signal 20, in summer 22. Summer output 24 feeds back into AEC 26 in order to provide AEC 26 a feedback signal from which cancellation effectiveness can be measured. Acoustic Echo Cancelers are known in the telephone art and specific details of the preferred embodiment are identified in the above-cited related applications. Additional information on Acoustic Echo Cancelers can be found in "Acoustic Echo Cancellation with the WE DSP16A Digital Signal Processor," by S. M. Kuo and H. Zhao, AT&T application note.

Following echo cancellation in summer 22, summer output 24 is conditioned in a digital transmit attenuator 30 which controls the overall gain of the transmit path from microphone 12 to telephone line 44. The process of determining the level of attenuation at transmit attenuator 30 and in the complimentary receive attenuator 57 is integral to the fail-safe mechanism of the present invention and will be discussed in greater detail with reference to FIG. 2 below.

Attenuator output 32 signal is next conditioned by noise fill-in 34 which compensates for the variations in background noise level in a manner as later described herein, associated with the dynamic operation of transmit attenuator 530. Transmit attenuator 30 and receive attenuator 57 insert appropriate amounts of attenuation into the speaker and microphone signal paths while speaker phone 10 is operating in any of six states of operation shown and described in Table II below.

Attenuators 30 and 57 ensure the system loop stability when the adaptive filters of the AEC 26 and Line Echo Canceler 40 are not fully converged and enhance the performance of both echo cancelers 26,40 when speaker phone 10 is in normal operation. As attenuator 30 adjusts to reduce the signal transmission level and maintain loop stability, the level of the background noise is also proportionally reduced. Thus, the far-end users can hear the variations in the background noise level. It not only is annoying, but also gives a perception of being in the half-duplex operation mode even though speaker phone 10 is operating in full-duplex. The noise fill-in 34 operates to supplement the near-end transmit signals with a suitable amount of noise energy to alleviate this artifact. Conventional techniques for generating and adding pseudo random white noise are used. See "WE DSP16 and DSP 16A Application Software Library Reference Manual" by AT&T, October 1989.

Speaker signal 45 from telephone lines 44 is low-pass filtered and digitized at 8 kilohertz by codec 47. The digitized speaker signal 51 is combined with Line Echo Canceler (LEC) signal 49 in summer 53 to produce summer output 55. As in AEC 26, LEC 40 uses an adaptive filter to model the impulse response of the sidetones coming from the near-end signals via microphone 12. The replica of the sidetones is then eliminated from the speaker signals 51 to prevent the near-end talkers from hearing their own voices coming back. Similar to the adaptive filter in AEC 26, a conventional normalized least mean square algorithm is used. Summer output 55 is fed back to LEC 40 to measure the effectiveness of the echo cancellation.

Following echo cancellation on the receive side, summer output 55 connects to receive attenuator 57, which functions in a manner similar to that of transmit attenuator 30, and acts as a control point for maintaining a stable overall system loop gain. Attenuator output 59 is then processed by filter 63 in order to compensate for any spectral variations which will be introduced by speaker 71. The output signal of filter 63 is selectively fed back in signal 64 to enhance stability, as described below. Conversion from a digital signal at the output of filter 63 to an analog signal occurs in codec 65, and the analog signal is transduced for the near-end listener by speaker 71.

Figure 2:
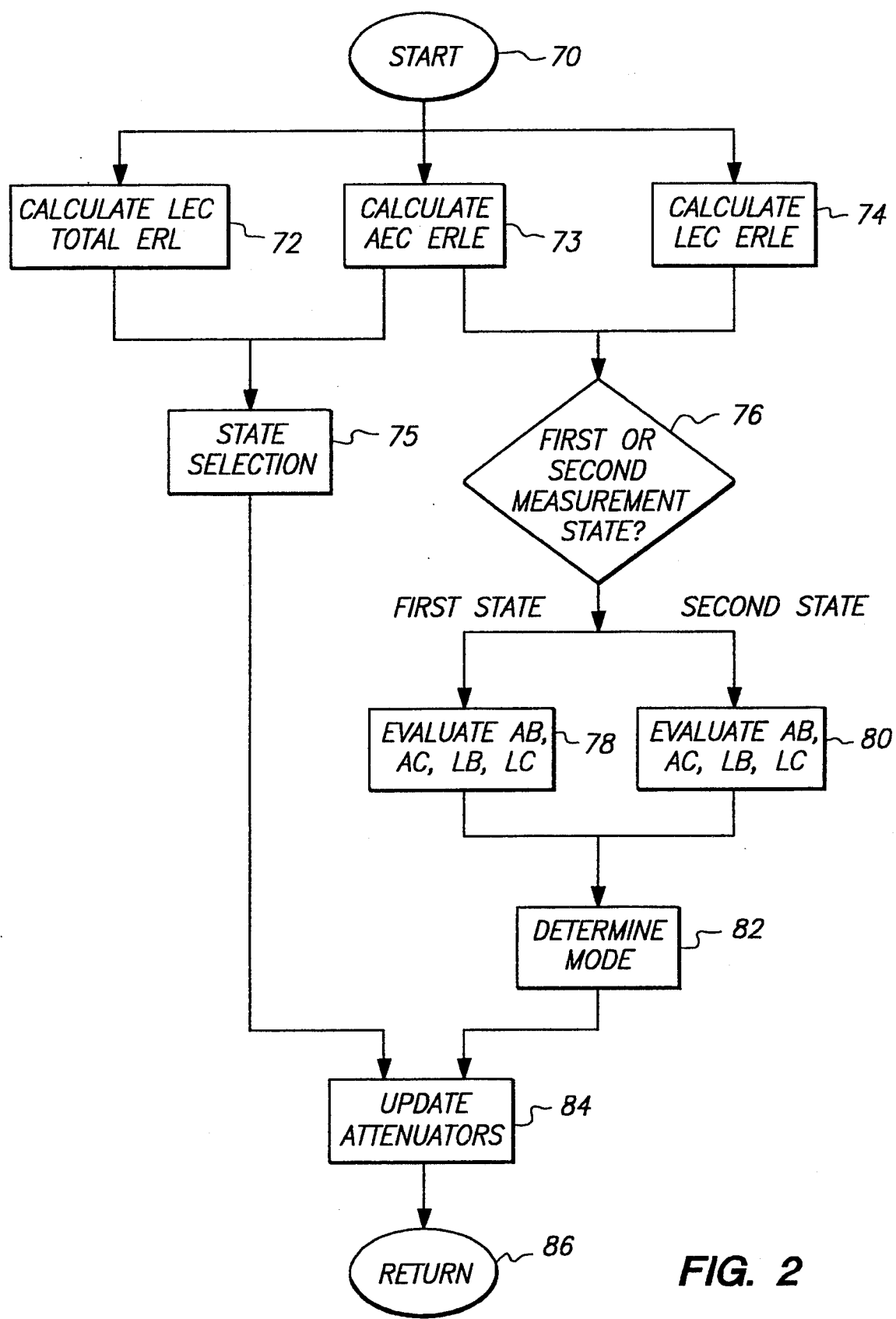
FIG. 2 illustrates a flow chart for implementing the fail-safe operation method for maintaining transmit and receive loop stability in the speaker phone of FIGS. 1 (a) and (b).

Referring now to FIG. 2, a flow chart is shown illustrating the process steps by which the fail-safe mechanism of the present invention operates on speaker phone 10 to safe-guard loop stability and ensure reliable operation. The fail-safe mechanism of the present invention is a protocol in which the attenuators 30 and 57 are controlled within one of four modes of operation: transmit, receive, fast idle and slow idle. The process summarized by the flow chart of FIG. 2 is the method by which the appropriate fail-safe operating mode is selected and the attenuators are effectively controlled.

The first or transmit mode is characterized by transmit attenuator 30 being fully on (no attenuation) and the receive attenuator 57 being set to a minimum value. This minimum receive attenuator 57 value used in the preferred embodiment is a variable of the operating state (rcv_min in Table II). The minimum receive attenuator value varies from −6 dB in the best state to −40 dB in the worst case state while speaker phone 10 is operating in half-duplex. This transmit mode occurs in the presence of a near-end talker with the far-end silent.

Correspondingly, the second or receive mode is characterized by the minimum value of transmit attenuator 30 and the zero attenuation of receive attenuator 57. In this mode, the far-end speaker is talking and the near-end is silent.

A third mode of operation is referred to as "fast idle" and occurs when both the near- and far-ends are simultaneously talking or when the parameters AB, AC, LB and LC provide conflicting information. Transition to one of the other modes of operation (transmit, receive, or slow idle) from fast idle is designed to occur very quickly. The fourth mode of operation is "slow idle." Slow idle generally is the mode used when both the far-end and the near-end are silent. Transition from the slow idle mode to one of the other three modes occurs approximately 50 times more slowly than from the fast idle.

The fail-safe operation process starts in FIG. 2 at 70. Following start 70, the LEC total Echo Return Loss (ERL), the AEC Echo Return Loss Enhancement (ERLE) and the LEC Echo Return Loss Enhancement (ERLE) are calculated in 72, 73 and 74, respectively. The LEC total ERL is defined as the ratio of the feedback energy to the signal energy of de-emphasized signal 38, where the feedback energy is defined as the microphone signal energy which feeds around the loop as a component of signal 55. The AEC ERLE is determined by dividing the energy of the echo in summer output 24 by the energy in processed signal 20. The LEC ERLE is determined by dividing the energy of the echo in the summer 53 output by the energy in digitized speaker signal 51.

Following the calculation of LEC ERLE and AEC ERLE, the determination 76 of whether to use a first measurement state or a second measurement state is made. The first measurement state and the second measurement state will be used to determine the variables AB, AC, LB, and LC discussed in detail below. The distinction between the first measurement state and the second measurement state lies in the locations within speaker phone 10 at which signal levels used in the variable determinations are measured. Both LEC ERLE and AEC ERLE are compared to empirically-derived thresholds, and if both the LEC ERLE and AEC ERLE are below these thresholds, the echo propagating within the system is determined to be sufficiently low to use a feedback signal to control stability. If an excessive echo signal level exists, a feedforward signal is used, while the adaptive filters in AEC 26 and LEC 40 work to remove the unwanted echo. LEC ERLE and AEC ERLE thresholds vary with numerous factors, and in the preferred embodiment, they are $-3$ dB and $-6$ dB, respectively. The first measurement state defines the condition in which measurement points in the transmit and receive paths are used which relate to feedforward signal control. The second measurement state defines the condition in which measurement points in the transmit and receive signal paths are used which relate to feedback signal control.

Following the determination in step 76, four parameters (AB, AC, LB, and LC) are evaluated in steps 78 and 80. If the use of the first measurement state is determined in 76, then the variable evaluation in 78 is selected. If the use of the second measurement state is determined in 76, the evaluation of the parameters occurs in step 80. The important distinction between steps 78 and 80 is the location within speaker phone 10 at which signal levels used in the variable determinations are measured. As will be described in detail below, the entry of speaker phone 10 into each of the four fail-safe modes of operation (i.e., receive, transmit, fast idle, or slow idle) occurs in response to one set of signal levels when the first measurement state is used and to a distinct set of signal levels if speaker phone 10 uses the second measurement state.

The evaluation of AB, AC, LB, and LC occurs in step 78 when speaker phone 10 is determined 76 to use the first measurement state. The definition for each of these parameters is as follows:

AB is a binary flag which is "set" to "1" when the signal level of processed signal 20 exceeds the background noise level by a certain margin, where processed signal 20 represents the post pre-emphasis signal. This signal level to noise level comparison can be made in a single comparison across the entire frequency spectrum or it can be made through a series of comparisons across discrete frequency bands that comprise the entire spectrum. In the preferred embodiment, the comparison is made across three discrete frequency bands called frequency sub-bands by first passing the signal through a filter bank. In the preferred embodiment, the filter bank comprises three filters: a low pass filter with a pass band from 0 to 800 Hz, a band pass filter with a pass band from 800 Hz to 2400 Hz and a high pass filter with a pass band from 2400 Hz to 4000 Hz. If the comparison is being made across more than one frequency sub-band then the AB binary flag is "set" to "1" if any one frequency sub-band indicates that the signal level exceeds the background noise level by the required threshold. In the preferred embodiment, a 9 dB margin is used so that the microphone signal 14 is declared present only if it exceeds the background noise level substantially.

AC is a binary flag that is set to "1" when the following equation is true in the comparison of the signal levels of processed signal 20 and attenuator output 59:

$$level\_20 * th\_ac + bias\_ac > level\_59$$

where th_ac is a scaling factor to adjust the two signal levels for proper comparison and to determine the sensitivity of the acoustic comparator AC. The term th_ac is also a variable of AEC ERLE. The sensitivity of the parameter AC can be varied by changing the value of th_ac according to the performance of the AEC. A bias term bias_ac is used to compensate for the noise in the signal level estimations of processed signal 20 and attenuator output 59. This signal level comparison can be made in a single comparison across the entire frequency spectrum or it can be made through a series of comparisons across discrete frequency bands called sub-bands that comprise the entire spectrum. In the preferred embodiment, the comparison is made across three discrete frequency sub-bands by first passing each signal through a filter bank. In the preferred embodiment, the filter bank comprises three filters: a low pass filter with a pass band from 0 to 800 Hz, a band pass filter with a pass band from 800 Hz to 2400 Hz and a high pass filter with a pass band from 2400 Hz to 4000 Hz. If the comparison is being made across more than one frequency sub-band then the AC binary flag is "set" to "1" if any one frequency sub-band indicates that the comparison equation holds true, where th_ac can vary in different sub-bands according to the ERLE calculated in that specific sub-band.

LB is a flag similar to AB which is set to "1" when the signal level of digitized speaker signal 51 exceeds the background noise level by a certain margin, where digitized speaker signal 51 is pre-echo canceled; and LC is a flag similar to AC which is set to "1" when the signal level of digitized speaker signal 51 exceeds the signal level of de-emphasized signal 38 by an appropriate threshold in a similar comparison as that of AC.

In the event that a second measurement state is determined in 76, the evaluation of the four parameters occurs in step 80. The definition for each of these parameters is as follows:

AB is a binary flag which is "set" to "1" when the signal level of summer output 24 exceeds the background noise level by a certain margin, where summer output 24 represents a pre-transmit attenuator signal. As explained for the first measurement state case, this signal level to noise level comparison can be made in a single comparison across the entire frequency spectrum or it can be made through a series of comparisons across discrete frequency sub-bands that comprise the entire spectrum. In the preferred embodiment, the comparison is made across three discrete frequency sub-bands by first passing the signal through a filter bank. In the preferred embodiment, the filter bank comprises three filters: a low pass filter with a pass band from 0 to 800 Hz, a band pass filter with a pass band from 800 Hz to 2400 Hz and a high pass filter with a pass band from 2400 Hz to 4000 Hz. If the comparison is being made across more than one frequency band then the AB binary flag is "set" to "1" if any one frequency sub-band indicates that the signal level exceeds the background noise level by the required threshold.

AC is a binary flag that is set to "1" when the signal level of summer output 24 exceeds the signal level of AEC signal 28 by an appropriate threshold similar to that in the case in which the first measurement state is used, where AEC signal 28 represents a post adaptive filter signal. As explained for the first measurement state case, this signal level comparison can be made in a single comparison across the entire frequency spectrum or it can be made through a series of comparisons across discrete frequency sub-bands that comprise the entire spectrum. In the preferred embodiment, the comparison is made across three discrete frequency bands by first passing each signal through a bank of filters. In the preferred embodiment, the filter bank comprises three filters: a low pass filter with a pass band from 0 to 800 Hz, a band pass filter with a pass band from 800 Hz to 2400 Hz and a high pass filter with a pass band from 2400 Hz to 4000 Hz. If the comparison is being made across more than one frequency band then the AC binary flag is "set" to "1" if any one frequency sub-band indicates that the comparison equation holds true.

LB is a flag similar to AB which is set to "1" when the signal level of summer output 55 exceeds the background noise level by a certain margin, where summer output 55 represents a pre-receive attenuator signal; and LC is a flag similar to AC which is set to "1" when the signal level of summer output 55 exceeds LEC signal 49 level by an appropriate threshold, where LEC signal 49 represents a post adaptive filter signal.

Once the four parameters are evaluated, the operating mode can be found using the following look-up table (TABLE I) in step 82:

TABLE I

| AC | LC | AB | LB | MODE |
|---|---|---|---|---|
| 1 | 0 | 1 | X | transmit |
| 1 | 1 | 1 | 0 | fast idle |
| 1 | 1 | X | 1 | fast idle |
| 0 | 0 | 1 | X | fast idle |
| 0 | 0 | 0 | 1 | fast idle |
| 0 | 1 | X | 1 | receive |
| 1 | 0 | 0 | X | slow idle |
| 1 | 1 | 0 | 0 | slow idle |
| 0 | 0 | 0 | 0 | slow idle |
| 0 | 1 | X | 0 | slow idle |

Once the operating mode is determined in 82, the attenuation levels of attenuators. 30 and 57 are updated to reflect values of the present mode. In the transmit mode shown in TABLE I, transmit attenuator 30 should be fully turned on, while receive attenuator 57 should be set to a minimum value (full attenuation) to restrict signal reception. The minimum value is a variable of the state as determined in step 75 discussed below. The attenuations for both the transmit attenuator 30 and receive attenuator 57 are oppositely set in the receive mode—transmit attenuator 30 is set to a minimum value, while the receive attenuator is fully turned on (minimum attenuation). Transition to the transmit or receive mode is gradual to avoid audible clicking in the speaker phone 10 communication signal which would be present if instantaneous switching were to occur. The fast idle and slow idle modes of TABLE I are characterized by the rate at which the attenuation values of attenuators 30 and 57 change with changes in AEC ERLE and LEC total ERL. As the name suggests, in the fast idle mode the rate of change of the attenuators is much greater than the rate which occurs during slow idle. The difference in rate of change in these two modes is approximately 50.

Also a component in the updating 84 of attenuators 30 and 57 is the state selection of step 75. Values for LEC total ERL and AEC ERLE are applied to the lookup table of TABLE II. Then, an appropriate state among the possible six states is selected to determine the minimum values of transmit and receive attenuators (xmit_min and rcv_min), and the amount of attenuation in idle modes (atten_idle).

TABLE II

| state | AEC ERLE | LEC Total ERL | xmit_min | rev_min | atten_idle |
|---|---|---|---|---|---|
| 0 | $> -6$ dB | $> -18$ dB | $-40$ dB | $-40$ dB | $-20$ dB |
| 1 | $-9 <-> -6$ dB | $-21 <-> -18$ dB | $-34$ dB | $-22$ dB | $-11$ dB |
| 2 | $-12 <-> -9$ dB | $-24 <-> -21$ dB | $-31$ dB | $-18$ dB | $-9$ dB |
| 3 | $-15 <-> -12$ dB | $-27 <-> -24$ dB | $-28$ dB | $-14$ dB | $-7$ dB |
| 4 | $-18 <-> -15$ dB | $-30 <-> -27$ dB | $-26$ dB | $-10$ dB | $-5$ dB |
| 5 | $< -18$ dB | $< -30$ dB | $-25$ dB | $-6$ dB | $-3$ dB |

The fail-safe process ends in step 86 and returns to start 70 every 1 millisecond (or 8 samples of sampled data).

What is claimed is:

1. A method for maintaining loop stability between a transmit and a receive path of a full-duplex speaker phone by selectively controlling an attenuator in the transmit path and an attenuator in the receive path, the method comprising the steps of:

calculating a transmit energy ratio and a receive energy ratio;

determining from the transmit energy ratio and the receive energy ratio whether to use a first measurement state or a second measurement state for evaluating a set of operating parameters;

evaluating the set of operating parameters based on signal levels from sample points in the transmit and the receive paths, wherein the evaluation of the set of operating parameters during use of the first measurement state further comprises the substeps of:

a. comparing a post pre-emphasis signal level to a pre-emphasis background noise level, b. comparing the post pre-emphasis signal level multiplied by a scale factor and added to a bias factor, to an attenuated output of a receive signal, c. comparing a pre-echo cancellation signal level to a pre-echo cancellation background noise level, and d. comparing the pre-echo cancellation signal level to a post de-emphasis signal level;

determining an attenuator operating mode based on the set of evaluated operating parameters; and adjusting the transmit path attenuator and the receive path attenuator based on the determined attenuator operating mode in order to maintain loop stability between the transmit and receive paths.

2. The method as recited in claim 1, wherein the comparisons in step (a) and in step (b) are performed for several frequency sub-bands which comprise an entire frequency spectrum.

3. A method for maintaining loop stability between a transmit and a receive path of a full-duplex speaker phone by selectively controlling an attenuator in the transmit path and an attenuator in the receive path, the method comprising the steps of:

calculating a transmit energy ratio and a receive energy ratio;

determining from the transmit energy ratio and the receive energy ratio whether to use a first measurement state or a second measurement state for evaluating a set of operating parameters;

evaluating the set of operating parameters based on signal levels from sample points in the transmit and the receive paths, wherein the evaluation of the set of operating parameters during use of the second measurement state further comprises the substeps of:

a. comparing a pre-transmit attenuator signal level to a pre-transmit attenuator background noise level, b. comparing the pre-transmit attenuator signal level to a post-acoustic echo canceler signal level, c. comparing a pre-receive attenuator signal level to a pre-receive attenuator background noise level, and d. comparing the pre-receive attenuator signal level to a post line echo canceler signal level;

determining an attenuator operating mode based on the set of evaluated operating parameters; and adjusting the transmit path attenuator and the receive path attenuator based on the determined attenuator operating mode in order to maintain loop stability between the transmit and receive paths.

4. The method as recited in claim 3, wherein the comparisons in step (a) and in step (b) are performed for several frequency sub-bands which comprise an entire frequency spectrum.

5. The method as recited in claim 1, wherein the step of determining an attenuator operating mode based on the set of evaluated operating parameters comprises the substep of determining one of four modes of operation based on the set of evaluated operating parameters, wherein the four modes comprise:

a transmit mode, which is used when a near-end signal is present and when a far-end is silent;

a receive mode, which is used when a far-end signal is present and a near-end is silent;

a slow idle mode, which is used when both the far-end and the near-end are silent; and a fast idle mode, which is used when both far-end and near-end signals are present, and is also used when conflicting parameter values are present.

6. The method as recited in claim 1, wherein the method is repeated once approximately each millisecond.

* * * * *